United States Patent [19]

Capdebosco

[11] Patent Number: 4,932,298
[45] Date of Patent: Jun. 12, 1990

[54] CIRCULAR TOOL ARRANGEMENT ALLOWING QUICK CHANGING OF TOOLS

[75] Inventor: Bernard Capdebosco, Saint-Just Chaleyssin, France

[73] Assignee: SA Martin, France

[21] Appl. No.: 326,999

[22] Filed: Mar. 22, 1989

[30] Foreign Application Priority Data

Mar. 22, 1988 [FR] France .................. 88 04053

[51] Int. Cl.⁵ .................. B31B 1/22; B26D 7/26
[52] U.S. Cl. .................. 83/332; 83/665; 83/676; 83/699; 493/368; 493/475
[58] Field of Search .................. 83/332, 665, 629, 675, 83/676, 677, 678, 481, 482; 493/365, 367, 368, 471, 475

[56] References Cited

U.S. PATENT DOCUMENTS

| | | | |
|---|---|---|---|
| 3,952,637 | 4/1976 | Lambert et al. | 83/699 X |
| 3,985,066 | 10/1976 | Kern | 93/58.2 |
| 4,003,300 | 1/1977 | Grobman | 83/699 X |
| 4,502,357 | 3/1985 | Hussissian | 83/676 X |
| 4,805,502 | 2/1989 | Ishigure | 83/677 X |

Primary Examiner—Hien H. Phan
Assistant Examiner—Rinaldi Rada
Attorney, Agent, or Firm—Hill, Van Santen, Steadman & Simpson

[57] ABSTRACT

A circular tool arrangement wherein tools are held between first and second ring-shaped elements characterized by the first ring-shaped element having a first plurality of bores on a surface of the element on a first radius from the axis of the first ring-shaped element and having a groove receiving an inner ring having a second plurality of bores for receiving on a second radius, each of the tools having projections on one side for coacting with the first plurality of bores and projections on an opposite side for coacting with the second plurality of bores and the second ring-shaped element being provided with a circumferential groove for receiving the set of projections not being received in bores, and the second ring-shaped element also being provided with a recess which can be aligned with a tool position to provide space for removing the tool and inserting a new tool.

5 Claims, 3 Drawing Sheets

CIRCULAR TOOL ARRANGEMENT ALLOWING QUICK CHANGING OF TOOLS

BACKGROUND OF THE INVENTION

The present invention is concerned with a device which allows a quick removal and securing of sector-like tools for a circular tool arrangement that is supported on a rotary shaft, wherein several of the sector-like tools are circumferentially spaced on a common plane between two ring-shaped retaining elements.

A circular tool arrangement having two sector-shaped tools mounted between holding means is disclosed in U.S. Pat. No. 3,985,066, whose disclosure is incorporated by reference. The tools of this arrangement coact with a backup tool to either cut slots in a sheet-like member, such as a cardboard sheet or a paperboard sheet, or, if the tools are designed a different way, to form creases in the sheet-like member. The cutting action is achieved by means of several circular tool arrangements spaced laterally on the support shaft to create simultaneous cutting in several areas of the sheet. Owing to the two tools being diametrically facing one another and fastened on the circular tool arrangement, it is, thus, possible to carry out two cuts with every shaft rotation, for instance a cut into the leading or front edge of the blank and a cut into the trailing or rear edge of the blank. By positioning the tools relative to each other on the circumference of the arrangement, the spacing between the two cuts can be varied. A useful addition consists in the fitting of a tool or of a fixed member in the tool arrangement and providing the second tool as a movable member in the same plane of the circular tool arrangement. The movable member is shiftable angularly with regard to the fixed member. On known devices, the shiftable tool or members are fitted on an inner-toothed rim located within every circular tool arrangement, and this rim enables a simultaneous setting of all shiftable tools or members of all the circular tool arrangements on one shaft. This way of setting is obtained by means of a shaft passing through every circular tool arrangement and the shaft being equipped with a pinion for each of the arrangements. In this way, every pinion meshes with the teeth of the inner toothed rim and causes, upon rotation of the shaft, the revolution of each of the rims.

Every tool or member worn or possibly damaged needs to be changed easily. The changing of the tools or members should also be feasible, as required by the various sizes or kinds of cuts to be achieved, for which reason the necessity appears to use new tools or members. To this aim, the known tools or members are fitted on retaining elements by means of screws or very complex couplings, which are frequently subjected to trouble. Moreover, such designs are expensive to provide.

SUMMARY OF THE INVENTION

The main object of the present invention is, thus, to provide a solution enabling a quick removal or changing of the tool or member on a circular tool arrangement by means of a simple, efficient and economic design. To accomplish these goals, the present invention is directed to an improvement in a circular tool arrangement situated on a rotary shaft which has tools, whether they are cutting members or creasing members, spaced circumferentially on the same plane between two parallel ring-shaped retaining elements. The improvements are that the two ring-shaped retaining elements are formed by a first ring-shaped retaining element and a second ring-shaped retaining element, which is fitted on the rotary shaft, with the second ring-shaped retaining element being arranged in such a way as to allow it to be rotated angularly with regard to the first ring-shaped retaining element. The second ring-shaped element has at least one recess made along its circumference and extending radially towards an inner area, said recess having a circumferential size corresponding to the length of the tool. The first ring-shaped retaining element has, on one of its sides, a certain number of bores, which are spaced circumferentially on a first constant radius and are adapted to receive projections or nipples provided on the tool, said first ring-shaped retaining element being provided with an inwardly extending annular groove for receiving an inner rim having teeth provided on an inner surface thereof, said inner rim, on a surface, having a plurality of bores circumferentially arranged on a second constant radius destined to take up nipples fitted on the other lateral side of the tool, depending on whether said tool is to be pivoted on its own axis, said second retaining element having an inner surface with at least one concentric groove, which freely receives the nipple situated on the tool facing the inner surface of the second element, as the nipples on the other side of the tool are received in the bores of one of the first rim or the inner rim, said second rim being of movable position to clamp the tool with the projections received in one of the sets of bores so that the tool is clamped between the inner surfaces of the first and second retaining elements.

The device has the advantage that the fitting and removal of the tools does not need any fastening by means of screws. The fastening by means of nipples, which are simple to insert into the retaining elements, is much quicker and can be done without tools. For holding the tools or members inserted between the two ring-shaped retaining elements and, thereby, positioned, by means of the nipples in a given area, one of these ring-shaped retaining elements can simply be rotated with regard to the other after the insertion of the tool through a lateral recess existing in one of the retaining elements. With this method, the tools are enclosed between the two ring-shaped retaining elements. The fastening of the tools by means of the nipples is appropriate for the fixed tool as well as for the movable tool which is to be circumferentially adjusted with regard to said fixed tool. With regard to the fixed tool, the nipples are retained in the bores of the first retaining elements, whereas with the adjustable or movable tool, the nipples are engaged in the bores of the inner rim.

Other advantages and features of the invention will be readily apparent from the following description of the preferred embodiments, the drawings and claims.

DESCRIPTION OF THE PREFERRED EMBODIMENTS

Figure 2:
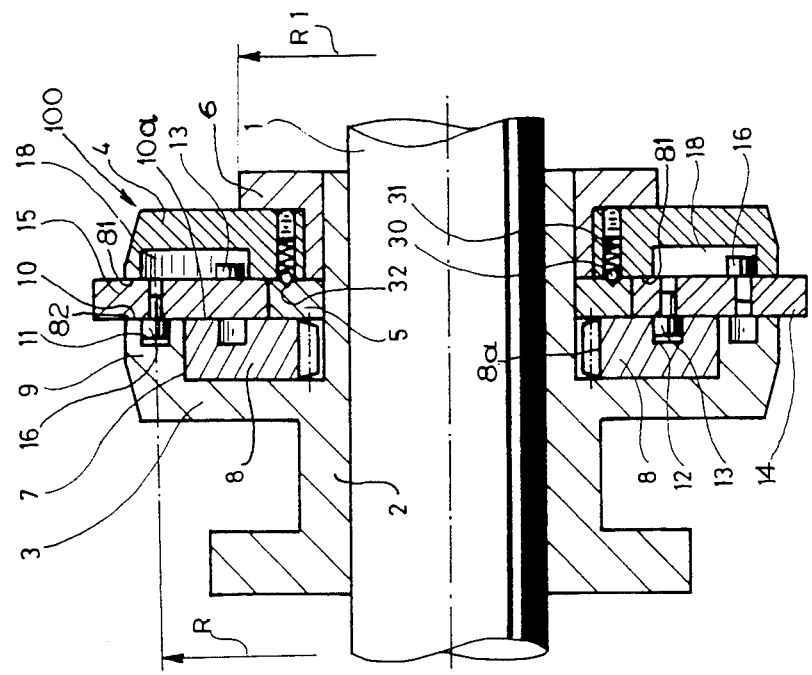
FIG. 2 is an axial cross sectional view of the tool arrangement of FIG. 1.
Figure 1:
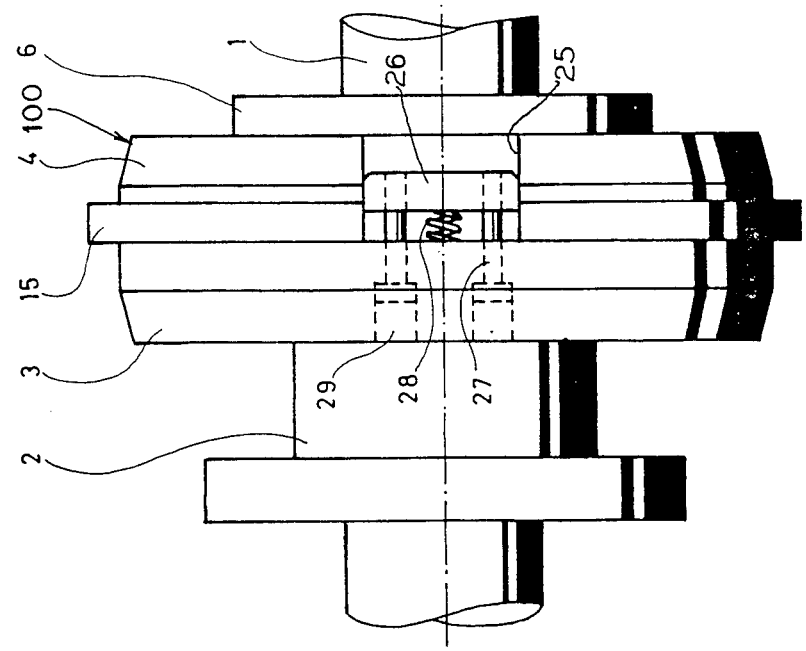
FIG. 1 is a side view of a circular tool arrangement in accordance with the present invention.

The principles of the present invention are particularly useful when incorporated in a tool arrangement, generally indicated at 100 in FIGS. 1 and 2. The tool arrangement 100 includes a first hub 2, which has a portion forming a first ring-shaped retaining element 3. The hub 2 is adjustably mounted on a shaft 1 by a key arrangement to rotate therewith. A second ring-shaped retaining element 4 coacts with the first ring-shaped element 3 and is mounted on the hub by two rings 5 and 6. The ring-shaped element has a groove 7 which is concentric with the axis of the shaft 1 and which forms a seat for receiving an inner rim 8 which, as illustrated in FIG. 2, is provided with teeth on an inner circumference 8a. The concentric seat or groove 7 of the ring-shaped retaining element 3 is machined in such a way that a front surface 10a of the rim 8 and a front side 82 of a collar 9 of the ring-shaped retaining element 3 are situated in a common plane 10. On a circle of a first radius R, this common plane 10 contains bores 11 which are machined into the collar 9 of the ring-shaped retaining element 3. The bores 11 are arranged angularly along the circumference created by the radius R. A second circle of a radius R1, which is smaller than the radius R, is provided and bores 12 are machined into the inner rim 8 to be equally arranged angularly along the circumference created by the radius R1. The distance between these bores corresponds to the distance between two nipples or projections 13 provided on the lower part of an adjustable tool 14, while the distance between the two bores 11 corresponding to the distance between two nipples 16 carried on the upper part of the fixed tool 15. As illustrated in FIG. 2, the tool 15 is mounted with the projections or nipples 16 received in the bores 11 of the collar 9, while the tool 14 is mounted with the projections 13 received in the bores 12 of the rim 8. The inner rim 8 can be driven by means of a pinion, which is not illustrated, to vary the circumference position of the movable tool 14 relative to the fixed tool 15. The rotary shaft 1 generally has several of the circular tool arrangements of identical design arranged side-by-side along the axis of the shaft. A drive shaft, which is not illustrated, supports a corresponding number of pinions, with one pinion for each of the circular tool arrangements in order to insure a simultaneous movement of all of the inner rims 8 to, thus, allow a simultaneous setting of all of the movable tools 14.

The second ring-shaped retaining element 4 has a circular groove 18 on its inner surface 81 which faces the combined surfaces 82 and 10a of the shoulder 9 and the rim 8. The groove 18 is for the purpose of receiving the nipples 13 or the nipples 16, depending on whether a fixed or movable tool is being used. Thus, the tool 15 is held in a fixed position, but the tool 14 can move with the rim, since the nipple 16 is received in the groove 18. It should be pointed out that the tools 14 and 15 are substantially the same, except that they are mounted by being inverted or turned through 180°.

Both the ring-shaped retaining elements 3 and 4 can be shifted angularly, one with regard to the other, on account of the fact that the nipples 13 or 16, depending on whether it is the fixed tool or the movable tool is used, will be received within the circular groove 18.

Figure 3:
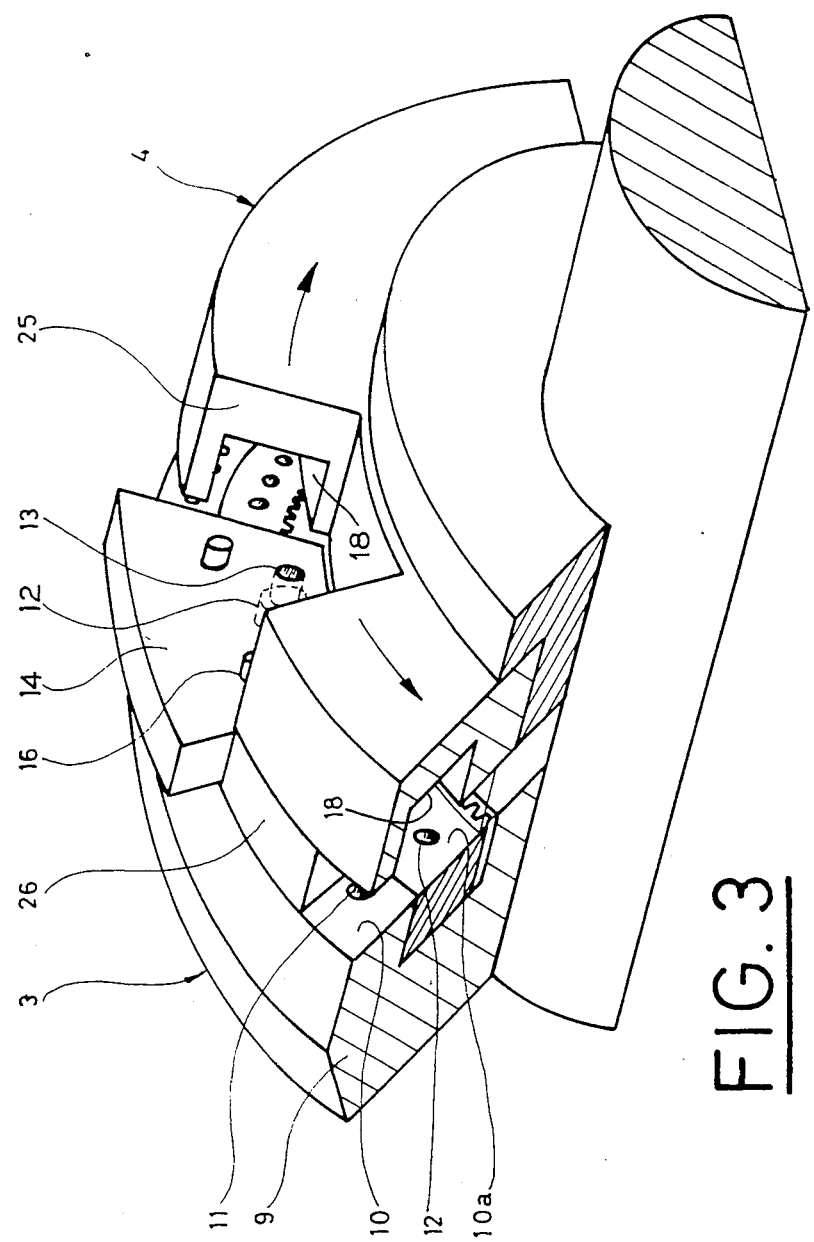
FIG. 3 is an enlarged partial perspective view of part of a circular tool arrangement of FIG. 1.
Figure 4:
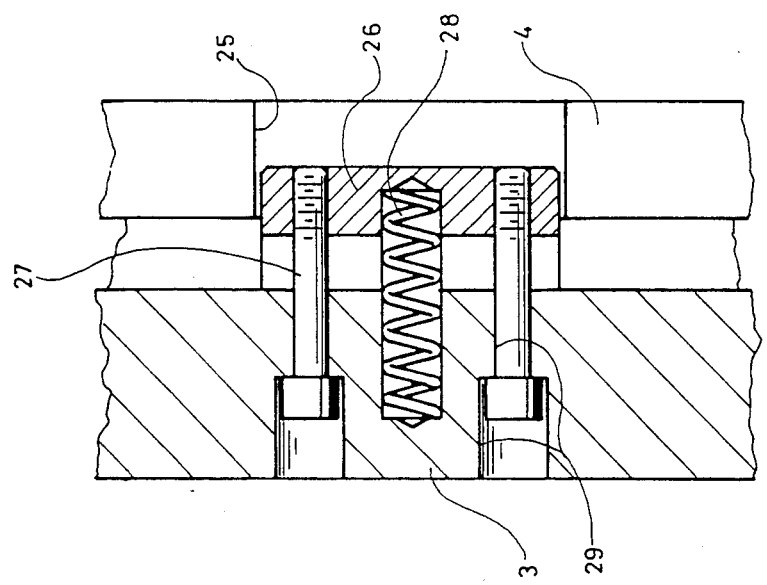
FIG. 4 is a top view with portions broken away for purposes of illustration of a locking appliance in accordance with one embodiment of the present invention.

With a view of being able to put the tool 15, of which several are fitted on the circumference of the circular tool arrangement between two ring-shaped retaining elements 3 and 4, a recess 25 (FIGS. 1, 3 and 4) is provided in the second ring-shaped element 4. This recess 25 extends radially towards the rotary shaft 1 from the outer edge of the ring-shaped retaining element. The recess 25 allows the tool to be put manually into their operating position, which action requires an alignment of the fastening nipples of each tool into the respective bores, as illustrated in FIG. 3, wherein a movable tool 14 has nipples 13 which are inserted into the bores 12 of the inner rim 8. Once the rotation of the ring-shaped retaining element 4 is accomplished, the nipples 16 will be received in the circular groove 18. With the movable tool 14 being properly positioned on the rim 8, the ring-shaped retaining element 4 will be shifted angularly until the recess 25 is opposite a locking appliance 26 which is constructed to be engaged in said recess 25 and to, thereby, interlock the ring-shaped retaining element 4 with regard to the other ring-shaped retaining element 3. This interlocking insures that the lateral position of the tool 14 of which the side will then be in contact with an inner surface 81 of the ring 4 and will be held between the surface 81 and the surfaces forming the plane 10.

The locking appliance 26, which has the same length as the recess 25, is mounted on the ring-shaped retaining element 3 by means of a partially threaded screw 27 (see FIG. 4), which are threaded into the locking appliance 26. A compression spring 28 is situated between the locking appliance 26 and the ring-shaped retaining element 3. The locking appliance 26 is pushed inwardly in an axial direction against the resistance of the spring in order to disengage it from the recess 25. In the course of this operation, the locking appliance 26 is guided by the partially threaded screws 27, whose non-threaded portions will shift in the bores 29 provided in the ring-shaped element 3. If the ring-shaped element 4 is rotated with regard to the other element 3, the locking appliance 26 will then be enclosed, whereupon the ring-shaped retaining element can be further rotated until its recess 25 is positioned opposite the tool 14 or 15, which is to be changed. In the positions shown in FIGS. 1 and 4, the ring-shaped retaining element 4 is interlocked by the locking appliance 26.

It should be noted that the slot or groove 25 forming the recess 25 has the same angular size as the tool.

Figure 5:
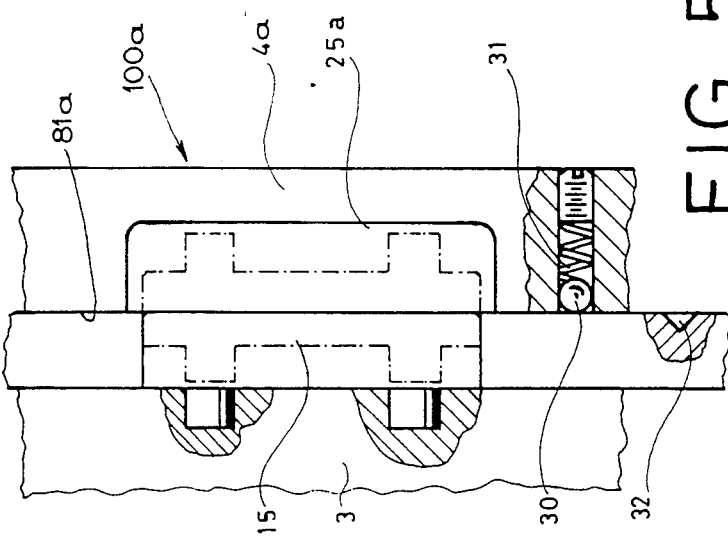
FIG. 5 is a top view with portions broken away for purposes of illustration of a modification of the circular tool arrangement of the present invention.

A modification of the embodiment of the circular tool arrangement is illustrated in FIG. 5 and generally indicated at 100a. In this arrangement, a recess 25a of the ring-shaped retaining means 4a only extends partially across the element and presents the shape of an open seat on the inner surface 81a of the retaining element 4a. A tool 14 or 15 can be radially put into the seat 25a. The ring-shaped retaining element 4a is then shifted angularly in such a way that the recess 25a will no longer stand opposite the tool 15 and, thus, the lateral position of the tool will be maintained. In this embodiment of the arrangement, the locking appliance 26 can appropriately be substituted by a simpler device containing, for instance, a ball 30 under a load of a spring 31 and designed for engaging after rotation of the ring-shaped retaining element 4a in a seat 32 added to an inside of the ring 5.

Although various minor modifications may be suggested by those versed in the art, it should be understood that I wish to embody within the scope of the patent granted hereon all such modifications as reasonably and properly come within the scope of my contribution to the art.

I claim:

1. A circular tool arrangement supported on a rotary shaft, said tool arrangement having tools spaced circumferentially on one plane, said arrangement comprising a first retaining element for mounting on said rotary shaft and having a ring shape and an axis, a second retaining element having a ring shape and being mounted on said first retaining element for rotation relative thereto, said second retaining element having at least one recess in a clamping surface facing the first retaining element, said recess extending from a circumference of the second retaining element radially inward and having a circumferential size corresponding to the size of the tool, said first retaining element on an engagement surface facing the second retaining element having a plurality of bores arranged circumferentially on a first constant radius and adapted for receiving a first set of nipples provided on a lateral surface of the tool, said first retaining element having a groove concentric with said axis forming a seat receiving an inner rim having teeth on one of the peripheral surfaces and having an engagement surface lying in a plane of the engagement surface of the first retaining element being provided with a plurality of bores arranged circumferentially on a constant second radius, said bores on said second radius being adapted to receive a second set of nipples provided on an opposite side of the tool from said first set of nipples, said clamping surface of the second retaining element facing said engagement surfaces of the first retaining element and the rim and having a groove concentric with the axis for receiving one of the sets of nipples when the other set is inserted in its respective bores, said groove in said second retaining element allowing the relative movement between the tool and said second retaining element to enable changing the circumferential position between said tools so that a tool can be removed by aligning the recess with the position of the tool to provide space for removing the tool and inserting a new tool.

2. A circular tool arrangement according to claim 1, wherein the recess extends inward from the clamping surface, but not entirely through said second retaining element and, thus, forms a space for receiving the tool during assembly and disassembly.

3. A circular tool arrangement according to claim 1, which includes interlock means for holding the second retaining element in a fixed circumferential position relative to the first retaining element.

4. A circular tool arrangement according to claim 3, wherein said interlock means comprises a locking appliance having a size of the circumferential length of the recess, said locking appliance being mounted for axial shifting on said first retaining element by rods extending through spaced apertures in said first retaining element, a spring being positioned between said first retaining element and said locking appliance to urge the locking appliance into a locking position in said recess of the second retaining element, whereby movement of the locking appliance out of said recess enables the second retaining element to be rotated relative to said first retaining element to a position aligned with a tool position for enabling removal and insertion of tools.

5. A circular tool arrangement according to claim 1, which includes detent means for holding the second retaining element in a circumferential position relative to said first retaining element, said detent means comprises a ball being biased by a spring into a recess associated with said first retaining element.

* * * * *